United States Patent
Lee

[11] Patent Number: 6,035,824
[45] Date of Patent: Mar. 14, 2000

[54] INTERNAL COMBUSTION ENGINE HAVING A DIRECT INJECTION COMBUSTION CHAMBER

[75] Inventor: Weon-hyung Lee, Kyungki-do, Rep. of Korea

[73] Assignee: Hyundai Motor Company, Seoul, Rep. of Korea

[21] Appl. No.: 09/199,436

[22] Filed: Nov. 25, 1998

[30] Foreign Application Priority Data

Nov. 28, 1997 [KR] Rep. of Korea ........................ 97-63752

[51] Int. Cl.⁷ .................................................... F02B 17/00
[52] U.S. Cl. ............................ 123/295; 123/636; 123/305
[58] Field of Search .................................... 123/295, 298, 123/301, 302, 305, 636, 638

[56] References Cited

U.S. PATENT DOCUMENTS

| | | | |
|---|---|---|---|
| 4,125,094 | 11/1978 | Noguchi et al. | 123/295 |
| 5,211,145 | 5/1993 | Ichikawa et al. | 123/305 |
| 5,269,243 | 12/1993 | Mochizuki | 123/305 |
| 5,746,171 | 5/1998 | Yaoita | 123/298 |

FOREIGN PATENT DOCUMENTS

| | | | |
|---|---|---|---|
| 61-250354 | 11/1986 | Japan | 123/295 |
| 525067 | 8/1940 | United Kingdom | 123/305 |

*Primary Examiner*—Erick R. Solis

[57] ABSTRACT

Disclosed is an internal combustion engine having a direct injection combustion chamber. The internal combustion engine includes a fuel injector mounted in a cylinder head at substantially a center of the combustion chamber; an intake port and an exhaust port formed in the cylinder head and which exit into the combustion chamber on opposite sides of the fuel injector; a first spark plug mounted in the cylinder head such that a firing tip thereof is positioned under where the intake port exits into the combustion chamber, the first spark plug operating to ignite a lean mixture of fuel and air supplied to the combustion chamber by the intake port and the fuel injector; a second spark plug mounted in the cylinder head on one side of the fuel injector, and which ignites a fuel-air mixture of a stoichiometric ratio fed into the combustion chamber by the injector and the intake port; and a piston head provided on a upper face of a piston. A cavity is formed in the piston head of the piston and encompassing an area on the piston head corresponding to a where the fuel injector is positioned. The cavity is formed to a predetermined depth and a predetermined size, to both sides of an imaginary line formed by connecting points on the piston head corresponding to where the second spark plug and the fuel injector are positioned, such that a swirl effect of the fuel-air mixture in the combustion chamber is better generated.

12 Claims, 8 Drawing Sheets

INTERNAL COMBUSTION ENGINE HAVING A DIRECT INJECTION COMBUSTION CHAMBER

BACKGROUND OF THE INVENTION (a) Field of the Invention

The present invention relates to an internal combustion engine having a direct injection combustion chamber, and more particularly, to an internal combustion engine in which fuel is directly injected in a center of a combustion chamber and two spark plugs perform ignition, one under an intake port and the other at a periphery of an injector, such that stable combustion of ultra-lean fuel is realized.

(b) Description of the Related Art

The shape of a combustion chamber depends on the shape of the depression in the cylinder head and the shape of the piston head. Combustion is affected to a large extent by the shape of the combustion chamber.

One type of prior combustion chamber design is the open, or direct injection, combustion chamber in which fuel is injected directly into the combustion chamber. In the direct injection combustion chamber, the piston head is designed in various ways to cause turbulence of the air in the cylinder. Different piston head designs used for the open combustion chamber include a flanged-domed design, a dished design with a raised center area, and other irregularly shaped designs. Advantages for the open combustion direct injection design include good fuel economy and simplicity of design.

FIG. 13 shows a sectional view of a conventional direct injection combustion chamber and all related elements, and FIG. 14 shows a sectional view taken along line XIV—XIV of FIG. 13. An injector 4 directly injects fuel in a combustion chamber 2, and a swirl effect of the fuel is achieved as the fuel undergoes compression by a dished portion 6 formed on a head of a piston 8. Further, a spark plug 10 is provided in a center of the combustion chamber 2, the spark plug 10 acting to ignite the fuel fed into the combustion chamber 2 through the fuel injector 4.

In the conventional direct injection combustion chamber structured as in the above, the direction and manner in which the fuel undergoes the swirl effect is dependent upon the shape of the dished portion 6 of the piston 8. However, the swirl effect of the fuel is also affected by the rectilinear motion of the piston 8, and the speed at which the piston 8 undergoes the same (i.e., engine rpm). Accordingly, design of a piston head that minimizes this change in the swirl effect is difficult.

SUMMARY OF THE INVENTION

The present invention has been made in an effort to solve the above problems.

It is an object of the present invention to provide an internal combustion engine having a direct injection combustion chamber in which fuel is directly injected in a center of the combustion chamber and two spark plugs perform ignition, one under an intake port and the other at a periphery of an injector, such that stable combustion of ultra-lean fuel is realized.

To achieve the above object, the present invention provides an internal combustion engine having a direct injection combustion chamber. The internal combustion engine includes a fuel injector mounted in a cylinder head at substantially a center of the combustion chamber; an intake port and an exhaust port formed in the cylinder head and which exit into the combustion chamber on opposite sides of the fuel injector; a first spark plug mounted in the cylinder head such that a firing tip thereof is positioned under where the intake port exits into the combustion chamber, the first spark plug operating to ignite a lean mixture of fuel and air supplied to the combustion chamber by the intake port and the fuel injector; a second spark plug mounted in the cylinder head on one side of the fuel injector, and which ignites a fuel-air mixture of a stoichiometric ratio fed into the combustion chamber by the injector and the intake port; and a piston head provided on a upper face of a piston.

According to a feature of the present invention, a cavity is formed in the piston head of the piston encompassing an area on the piston head corresponding to a where the fuel injector is positioned. The cavity is formed to a predetermined depth and a predetermined size, to both sides of an imaginary line formed by connecting points on the piston head corresponding to where the second spark plug and the fuel injector are positioned such that a swirl effect of the fuel-air mixture in the combustion chamber is better generated.

According to another feature of the present invention, the cavity comprises a first section to one side of the imaginary line and a second section to the other side of the imaginary line, the first section forming a half oval and the second section forming a half circle, and the first section extending up to, but not encompassing, a point on the piston head corresponding to the position of the first spark plug.

According to yet another feature of the present invention, the cavity is formed in the piston head to one side of the line where the position corresponding to the first spark plug is located, the cavity being parabolic when viewed from above with a vertex of the cavity extending toward but not reaching the point on the piston head corresponding to the location of the first spark plug. Further, a depression is formed in the piston head to the other side of the line, the depression being in communication with the cavity and being significantly smaller than the same.

According to still yet another feature of the present invention, the cavity is elliptical and divided in two symmetrical halves along the line to form a first section and a second section, a point on the piston head corresponding to a position of the first spark plug being provided within the first section of the cavity, and a point on the piston head corresponding to a position of the second spark plug being provided outside the first and second sections.

According to still yet another feature of the present invention, the first spark plug is mounted in the cylinder head such that the firing tip of the same exits into the combustion chamber closer to a tip of the fuel injector. In addition, a raised platform in which the cavity is formed is provided on the piston head, the platform being oval-shaped with a majority of the same being positioned to a side of the line opposite to a position on the piston head corresponding to the first spark plug and the platform slanting downward toward the piston head on both sides of the line. Here, positions corresponding to the first and second spark plugs lie inside the cavity.

According to still yet another feature of the present invention, a raised platform in which the cavity is formed is provided on the piston head, the platform being substantially rectangular when viewed from above and dome-shaped in relation to a surface of the piston head, the cavity including a wide portion formed in a middle of the platform and a narrow portion extending to an end of the second section of the platform to a surface of the piston head.

According to still yet another feature of the present invention, a raised, dome-shaped platform in which the cavity is formed is provided on the piston head, edges of the platform at opposite ends of lengths of the same extending to almost a circumference of the piston head and following an arcuate shape of the same, while edges along a width of the platform being substantially straight and ending at a predetermined distance from the circumference of the piston head. Further, a line formed along a width of the platform divides the same in half to form a first section and a second section, the first and second sections slanting downward from the line toward the surface of the piston head, and the cavity extending into both the first and second sections and including a first portion and a second portion divided along the line.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
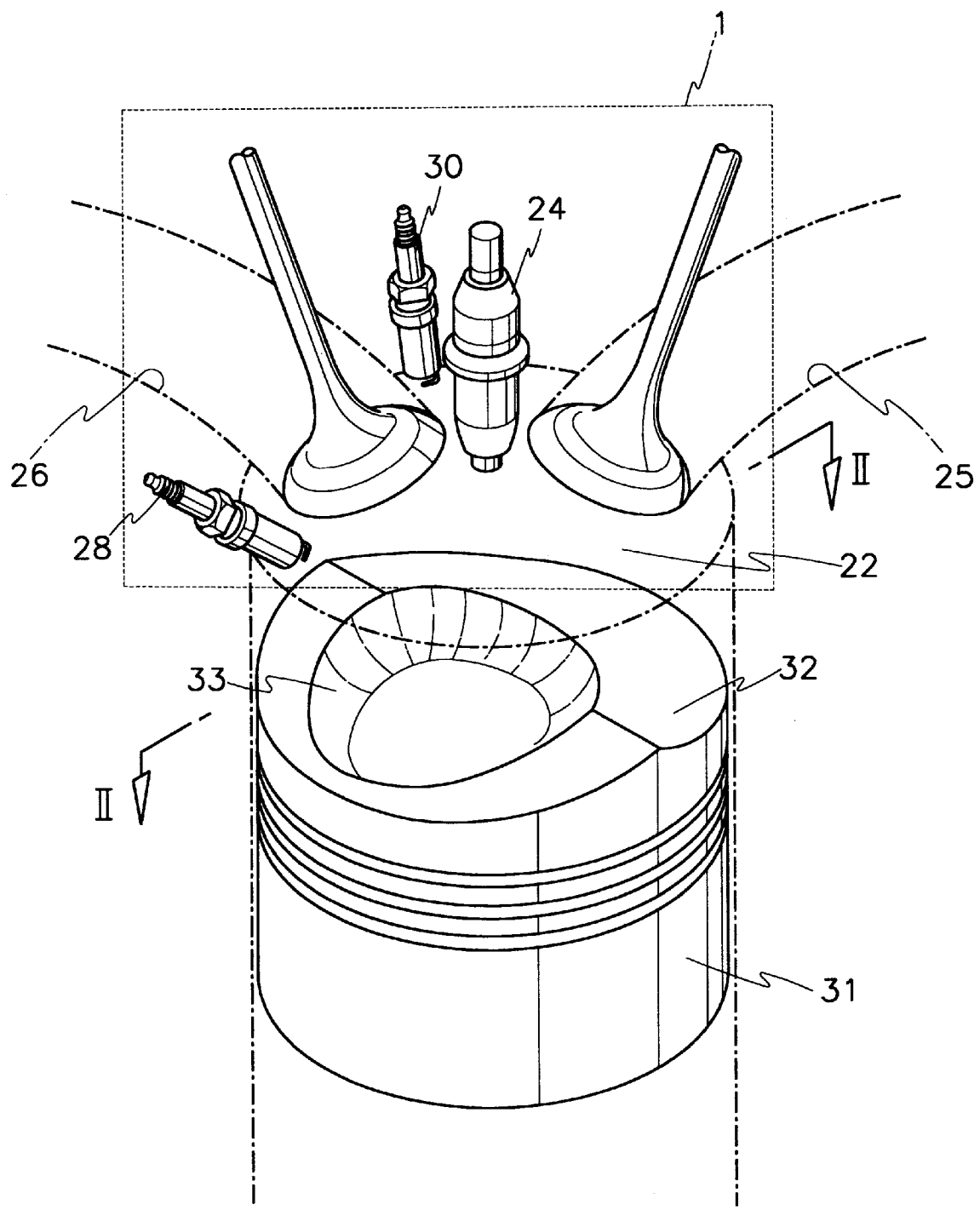
FIG. 1 is a sectional view of a direct injection combustion chamber, and all related elements, of an internal combustion engine according to a first preferred embodiment of the present invention.

Preferred embodiments of the present invention will now be described in detail with reference to the accompanying drawings. Certain terminology will be used in the following description for convenience and reference only and will not be limiting. The words "right" and "left" will designate directions in the drawings to which reference is made.

Figure 2:
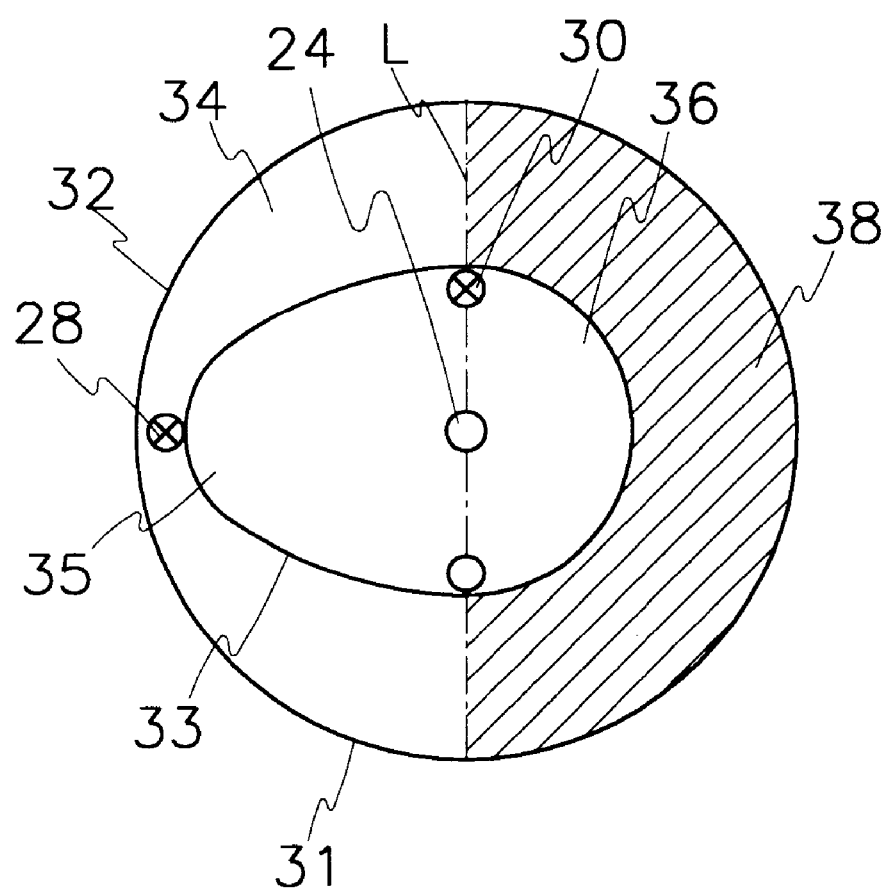
FIG. 2 is a sectional view taken along line II—II of FIG. 1.

FIG. 1 shows a sectional view of a direct injection combustion chamber, and all related elements, for an internal combustion engine according to a first preferred embodiment of the present invention; and FIG. 2 shows a sectional view taken along line II—II of FIG. 1.

A fuel injector 24 is mounted in a cylinder head 1 at substantially a center of a combustion chamber 22 and also at a slight slant such that the direction of fuel emitted from the fuel injector 24 slightly deviates from a longitudinal center axis of the combustion chamber 22. An intake port 26 and an exhaust port 25 are formed in the cylinder head 1 and exit into the combustion chamber 22 on opposite sides of the fuel injector 24.

A first spark plug 28 is mounted in the cylinder head 1 such that a firing tip of the same is positioned under where the intake port 26 exits into the combustion chamber 22. The first spark plug 28 is controlled by electric signals transmitted from an electronic control system (EGS), and operates to ignite a lean mixture of fuel and air. A second spark plug 30 is mounted in the cylinder head 1 on one side of the fuel injector 24, and ignites a fuel-air mixture of a stoichiometric ratio fed into the combustion chamber 22 by the fuel injector 24 and the intake port 26, the fuel injector 24 and the intake port 26 being controlled by electric signals transmitted from the ECS.

A piston 31 is provided in a cylinder of an engine block. The piston 31 undergoes rectilinear movement in the cylinder to form a movable bottom of the combustion chamber 22. Further, a cavity 33 is formed on a piston head 32 of the piston 31. Based on an imaginary line L formed by connecting points on the piston head 32 corresponding to where the second spark plug 30 and the fuel injector 24 are positioned, the cavity 33 has a first section 35 to the left of the line L and a second section 36 to the right of the line L. The first section 35 forms a half oval and the second section 36 forms a half circle. The first section of the cavity 33 extends to a point on the piston head 32 corresponding to the position of the first spark plug 28.

The piston head 32 is slanted to the left of the line L to form a slope 34 around a periphery of the first section 35 of the cavity 33, and to the right of the line L to form a squish area 38 around a periphery of the second section 36 of the cavity 33, the squish area 38 being indicated by the shaded area in FIG. 2 The squish area 38 acts to push air in the combustion chamber 22 toward the fuel injector 24 upward when the piston 31 ascends during its compression stroke. The point on the piston head 32 corresponding to where the first spark plug 28 is positioned lies in the slope 34, outside the first section 35 of the cavity 33.

In the combustion chamber 22 and related elements of the first preferred embodiment of the present invention structured as in the above, the ECS determines that the vehicle is driving at a low or medium speed, and performs control such that the fuel injector 24 and the intake port 26 admit a lean air-fuel mixture into the combustion chamber 22. The fuel is then ignited by the first spark plug 28.

In the above, the fuel is discharged by the fuel injector 24 on the second section 36 of the cavity 33 during the compression stroke of the piston 32, and is then directed toward the first section 35 of the cavity 33 by air forced upward and toward the fuel injector 24 by the squish area 38 of the piston head 32. Accordingly, a swirl effect of the lean air-fuel mixture in the combustion chamber 22 is realized and the first spark plug 28 ignites the mixture. The swirl effect enables an ultra-lean mixture of air and fuel to be ignited by the first spark plug 28.

On the other hand, if it is determined by the ECS that the vehicle is being driven under conditions requiring a stoichiometric air-fuel ratio, control is performed by the ECS such that the fuel injector 24 and the intake valve 26 admit a fuel-air mixture in the combustion chamber 22 to attain the stoichiometric ratio. At this time, fuel is injected on second section 36 of the cavity 33 during the compression stroke of the piston 32, and is then directed toward the first section 35 of the cavity 33 by air which is forced upward and toward the fuel injector 24 by the squish area 38 of the piston head 32. Accordingly, a swirl effect of the air-fuel mixture in the combustion chamber 22 and the second spark plug 30 ignites the mixture by signals from the ECS.

Figure 3:
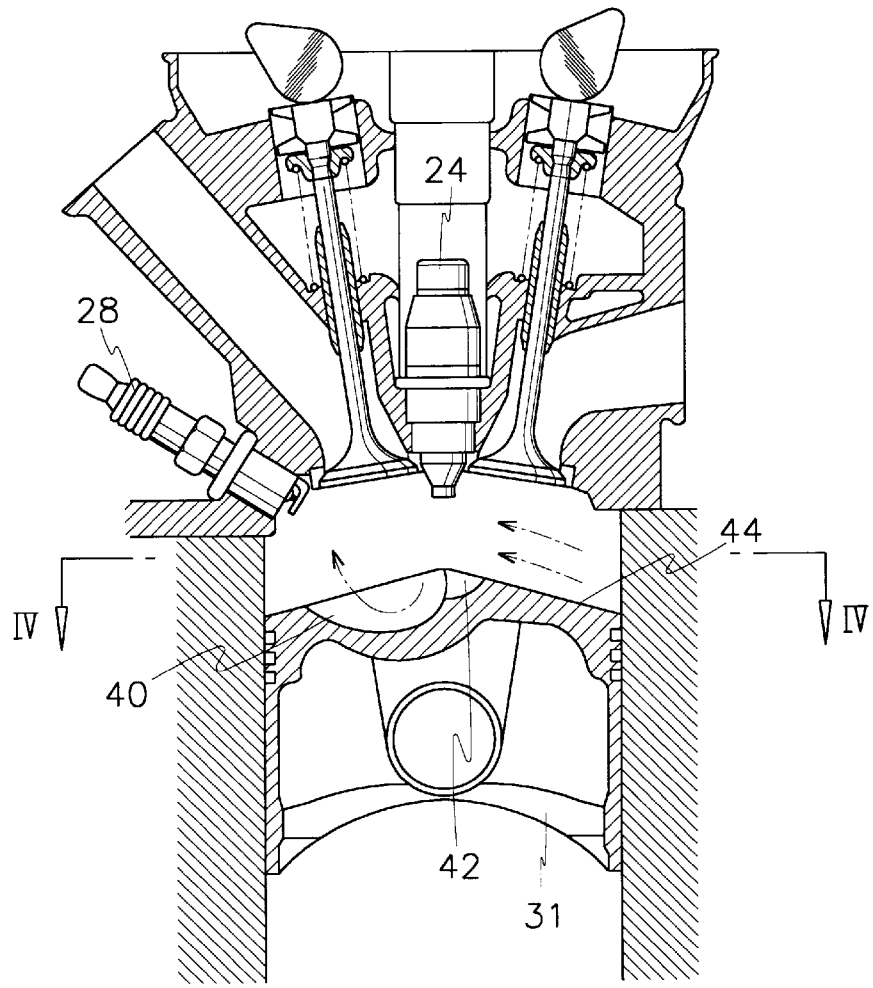
FIG. 3 is a sectional view of a direct injection combustion chamber, and all related elements, of an internal combustion engine according to a second preferred embodiment of the present invention.
Figure 4:
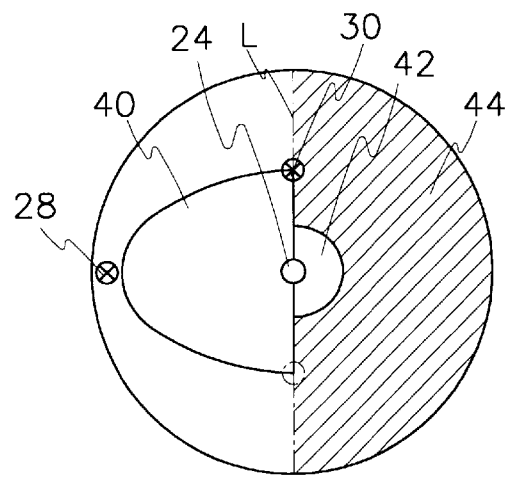
FIG. 4 is a sectional view taken along line IV—IV of FIG. 3.

FIG. 3 shows a sectional view of a direct injection combustion chamber, and all related elements, for an internal combustion engine according to a second preferred embodiment of the present invention: and FIG. 4 shows a sectional view taken along line IV—IV of FIG. 3. In the second embodiment, like reference numerals will be used for elements identical to those in the first embodiment.

A cavity 40 is formed in the piston head 32 to the left of the line L. The cavity 40 is parabolic when viewed from above as shown in FIG. 4 with a vertex of the cavity 40 extending toward but not reaching the point on the piston head 32 corresponding to the location of the first spark plug 28. Formed to the right of the line L in the piston head 32 is a depression 42. The depression 42 is in communication with the cavity 40 and is significantly smaller than the same.

A squish area 44 is formed to the right of the line L around a periphery of the depression 42 indicated by the shaded area of FIG. 4. The squish area 44 of the second embodiment is much larger than that of the first embodiment such that the point on the piston head 32 corresponding to the position of the second spark plug 30 lies within the squish area 44. With this increase in the size of the squish area 44, extending to nearly the point on the piston head 32 corresponding to the fuel injector 24, a powerful swish effect is realized.

Figure 5:
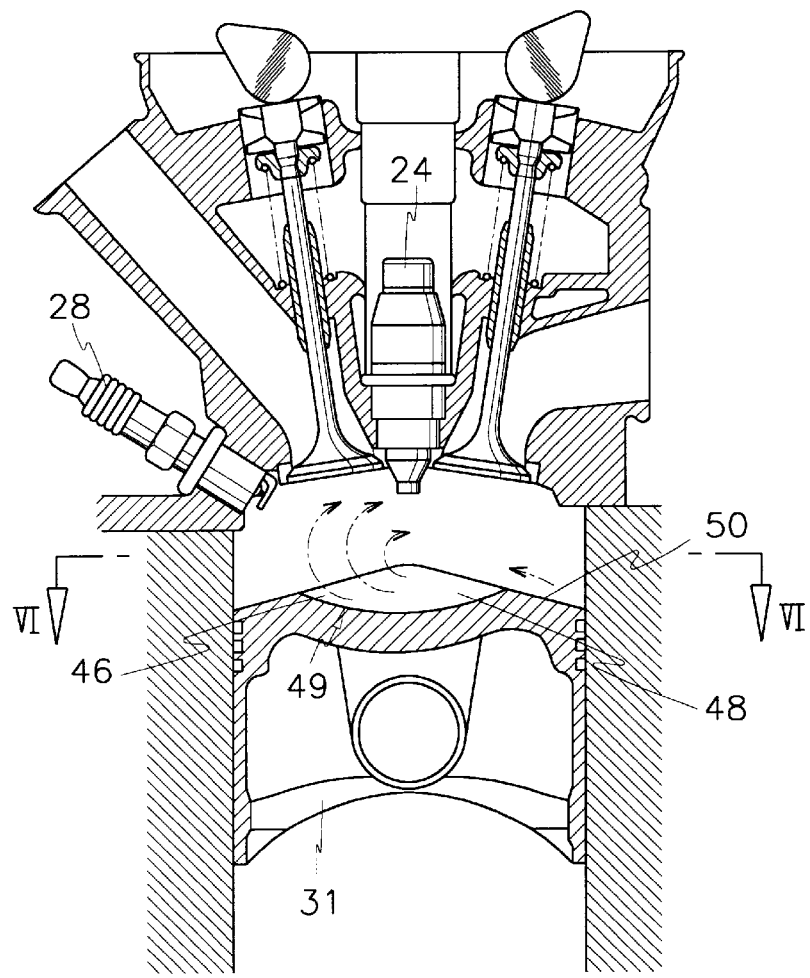
FIG. 5 is a sectional view of a direct injection combustion chamber, and all related elements, for an internal combustion engine according to a third preferred embodiment of the present invention.
Figure 6:
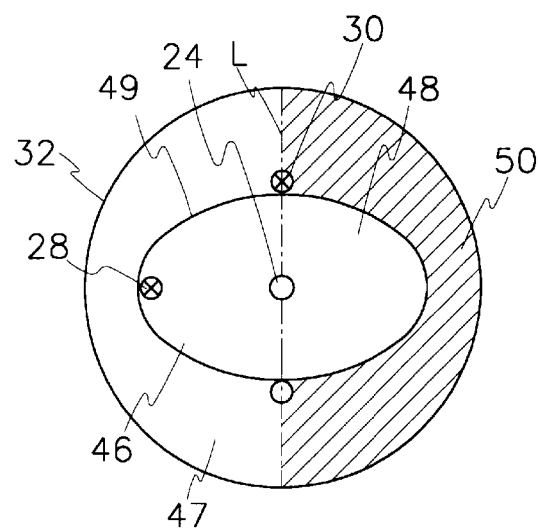
FIG. 6 is a sectional view taken along line VI—VI of FIG. 5.

FIG. 5 shows a sectional view of a direct injection combustion chamber, and all related elements, for an internal combustion engine according to a third preferred embodiment of the present invention; and FIG. 6 is a sectional view taken along line VI—VI of FIG. 5. In the third embodiment, like reference numerals will be used for elements identical to those in the first embodiment.

As shown in the drawings, a cavity 49 formed in the piston head 32 is elliptical and divided in two symmetrical halves along the line L to form a first section 46 and a second section 48. Further, the point on the piston head 32 corresponding to the first spark plug 28 lies within the first section 46 of the cavity 33, whereas the point on the piston head 32 corresponding to the second spark plug 30 lies outside the first and second sections 46 and 48 of the cavity 33.

A slope 47 is formed to the left of the line L around a periphery of the first section 46 of the cavity 33, and a squish area 50 is formed to the right of the line L around a periphery of the second section 48 of the cavity 33. The slope 47 and the squish area 50 are formed at slants of a predetermined angle with respect to a center of the piston head 32 along which the line L is formed. With the piston head 32 formed in this manner, a swirl of fuel and air formed under the fuel injector 24 is recirculated.

Figure 7:
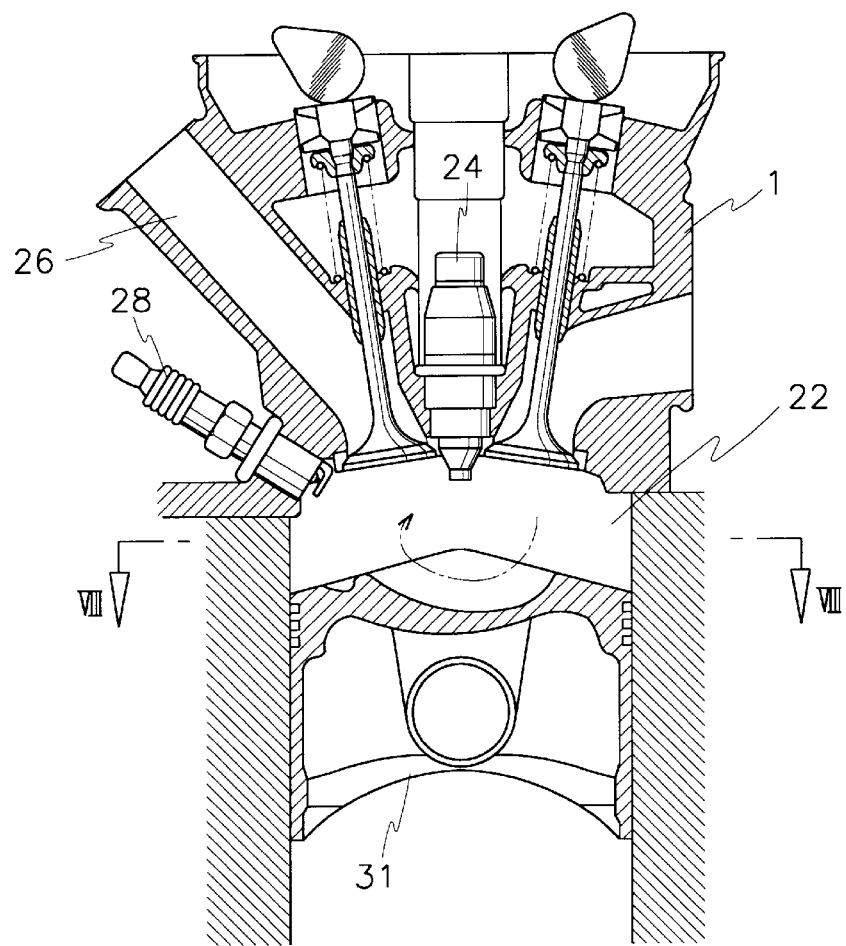
FIG. 7 a sectional view of a direct injection combustion chamber, and all related elements, for an internal combustion engine according to a fourth preferred embodiment of the present invention.
Figure 8:
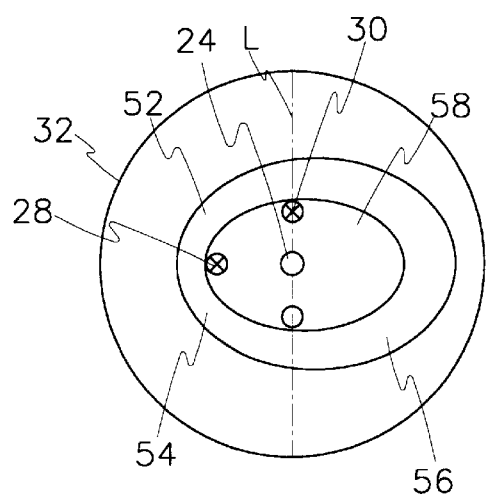
FIG. 8 is a sectional view taken along line VIII—VIII of FIG. 7.

FIG. 7 a sectional view of a direct injection combustion chamber, and all related elements, for an internal combustion engine according to a fourth preferred embodiment of the present invention; and FIG. 8 is a sectional view taken along line VIII—VIII of FIG. 7. Like reference numerals will be used in the fourth embodiment for elements identical to those in the first embodiment.

In the fourth embodiment, the fuel injector 24 is mounted in the cylinder head 1 at substantially the center of the combustion chamber 22 as in the first embodiment. However, the first spark plug 28 is mounted in the cylinder head 1 such that the firing tip of the same exits into the combustion chamber 22 closer to the tip of the fuel injector 24 than in the first embodiment.

Integrally formed on the piston head 32 is a raised platform 52. The platform 52 is oval-shaped with a majority of the same being positioned to the right of the line L. The platform 52 includes a first section 54 slanting downward to the left of the line L and a second section 56 slanting downward to the right of the line L. Provided within the platform 52 is a cavity 58. The cavity 58 is formed at a predetermined depth and is sized such that points on the platform 52 corresponding to positions of the first and second spark plugs 28 and 30 lie inside the cavity 58.

With the above configuration, fuel sprayed into the combustion chamber 22 by the fuel injector 24 tumbles after contact with the cavity 58 in a direction toward the first spark plug 28 to be ignited by the same.

Figure 9:
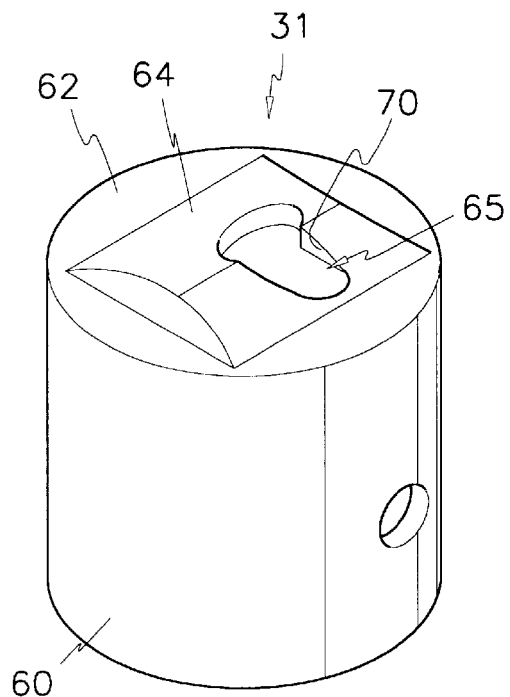
FIG. 9 is a perspective view of a piston for an internal combustion engine according to a fifth preferred embodiment of the present invention.
Figure 10:
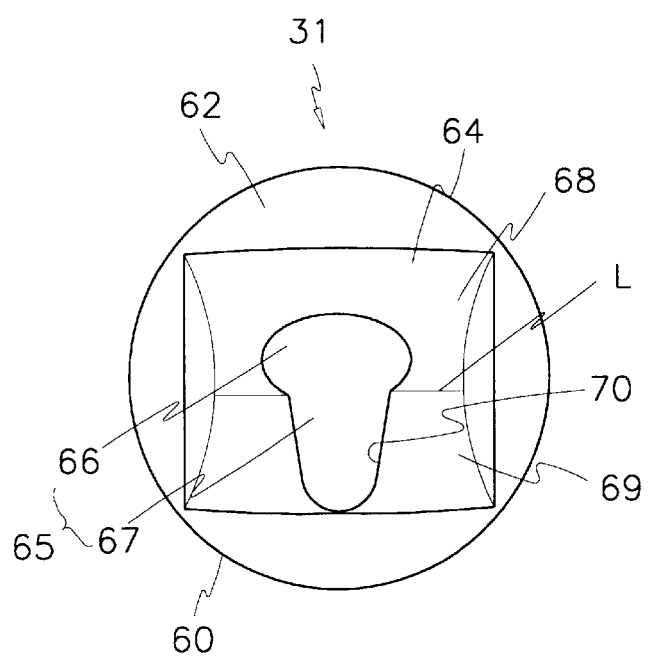
FIG. 10 is a top view of the piston shown in FIG. 9.

FIG. 9 is a perspective view of a piston for an internal combustion engine according to a fifth preferred embodiment of the present invention; and FIG. 10 is a top view of the piston shown in FIG. 9. In the drawings, reference numeral 60 is used to designate a piston of the fifth embodiment A piston head 62 of the piston 60 is formed having a raised platform 64 provided thereon. The piston head 62 is substantially rectangular when viewed from above and is domeshaped in relation to a surface of the piston head 62. That is, a line L formed along a length of the platform 64 at a center of a width of the same divides the platform 64 into a first section 68 and a second section 69 which are sloped downward toward the surface of the piston head 62.

As shown in the drawings, a cavity 65 is formed in the platform 64. The majority of the cavity 65 is formed in the second section 69 of the platform 64 and the cavity 65 includes a wide portion 66 formed in a middle of the platform 64 and a narrow portion 67 extending to an end of the second section 69 of the platform 64 to the surface of the piston head 62. Formed between the wide portion 66 and the narrow portion 67 of the cavity 65 is a corner 70 which pointedly protrudes into the cavity 65.

Figure 11:
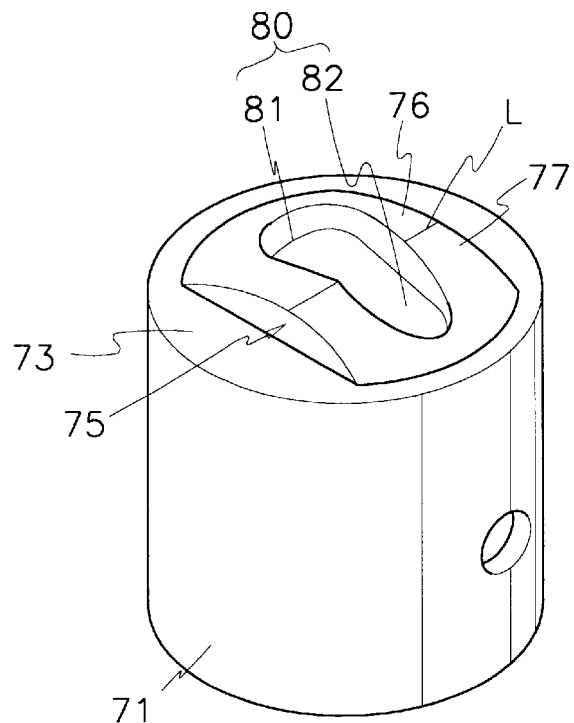
FIG. 11 is a perspective view of a piston for an internal combustion engine according to a sixth preferred embodiment of the present invention.
Figure 12:
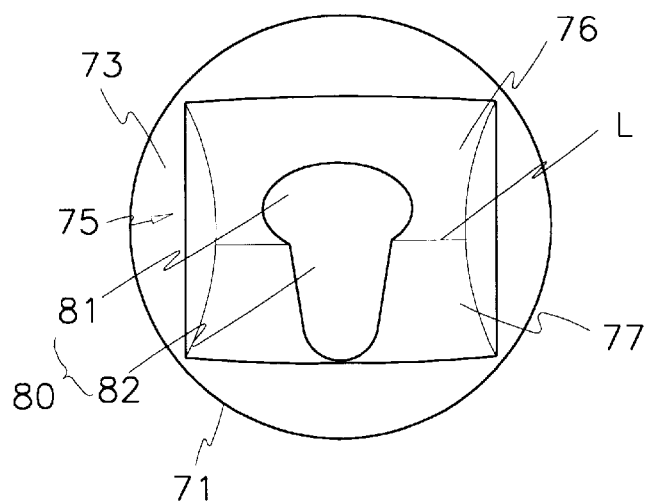
FIG. 12 is a top view of the piston shown in FIG. 11.
Figure 13:
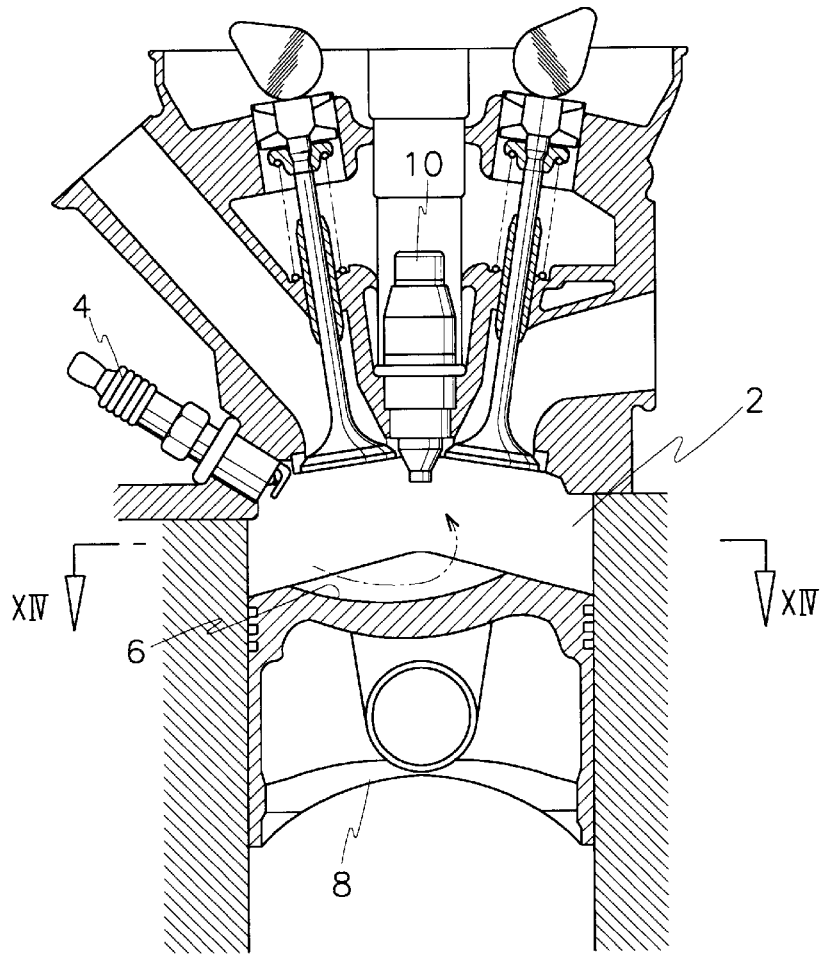
FIG. 13 is a sectional view of a direct injection combustion chamber, and all related elements, for a conventional internal combustion engine.
Figure 14:
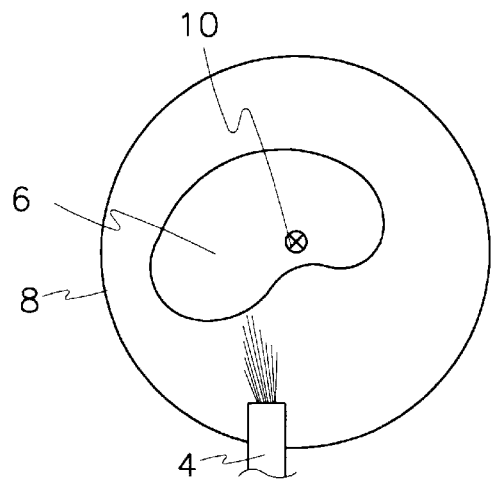
FIG. 14 is a sectional view taken along line XIV—XIV of FIG. 13.

FIG. 11 shows a perspective view of a piston of an internal combustion engine according to a sixth preferred embodiment of the present invention; and FIG. 12 is top view of the piston shown in FIG. 11. In the drawings, reference numeral 71 refers to a piston.

A piston head 73 of the piston 71 is formed having a raised, dome-shaped platform 75 provided thereon. Edges of the platform 75 at opposite ends of lengths of the same extend to almost a circumference the piston head 73 and follow the arcuate shape of the same, while edges along a width of the platform 75 are substantially straight and end at a predetermined distance from the circumference of the piston head 73. A line L formed along a width of the platform 75 divides the same in half to form a first section 76 and a second section 77 The first and second sections 76 and 77 slant downward from the line L toward the surface of the piston head 73.

As shown in the drawings, a cavity 80 is formed in the platform 64, the cavity 80 extending into both the first and second sections 76 and 77 of the platform 64.

In the combustion chamber of the present invention structured and operating as in the above, since the first and second spark plugs are selectively operated to respectively ignite a lean mixture of air and fuel and a mixture of a stoichiometric ratio, smooth driving can be achieved. Further, the different formations of the piston head in the present invention enable the effective combustion of fuel-air mixtures, both lean mixture or that of a stoichiometric ratio.

Other embodiments of the invention will be apparent to the skilled in the art from consideration of the specification and practice of the invention disclosed herein It is intended that the specification and examples be considered as exemplary only, with the true scope and spirit of the invention being indicated by the following claims.

What is claimed is:

1. An internal combustion engine having a direct injection combustion chamber comprising:

a fuel injector mounted in a cylinder head at substantially a center of the combustion chamber;

an intake port and an exhaust port formed in the cylinder head and which exit into the combustion chamber on opposite sides of the fuel injector;

a first spark plug mounted in the cylinder head such that a firing tip thereof is positioned under where the intake port exits into the combustion chamber, the first spark plug operating to ignite a lean mixture of fuel and air supplied to the combustion chamber by the intake port and the fuel injector;

a second spark plug mounted in the cylinder head on one side of the fuel injector, and which ignites a fuel-air mixture of a stoichiometric ratio fed into the combustion chamber by the injector and the intake port; and a piston head provided on a upper face of a piston.

2. The internal combustion engine of claim 1 further comprising a cavity formed in the piston head of the piston and encompassing an area on the piston head corresponding to a where the fuel injector is positioned, the cavity being formed to a predetermined depth and a predetermined size, to both sides of an imaginary line formed by connecting points on the piston head corresponding to where the second spark plug and the fuel injector are positioned, thereby helping to generate a swirl effect of the fuel-air mixture in the combustion chamber.

3. The combustion chamber of claim 2 wherein the cavity comprises a first section to one side of the imaginary line and a second section to the other side of the imaginary line, the first section forming a half oval and the second section forming a half circle, and the first section extending up to, but not encompassing, a point on the piston head corresponding to the position of the first spark plug.

4. The combustion chamber of claim 2 wherein the cavity is formed in the piston head to one side of the line where a position corresponding to the first spark plug is located, the cavity being parabolic when viewed from above with a vertex of the cavity extending toward but not reaching the point on the piston head corresponding to the location of the first spark plug.

5. The combustion chamber of claim 4 further comprising a depression formed in the piston head to the other side of the line, the depression being in communication with the cavity and being significantly smaller than the same.

6. The combustion chamber of claim 2 wherein the cavity is elliptical and divided in two symmetrical halves along the line to form a first section and a second section, a point on the piston head corresponding to a position of the first spark plug being provided within the first section of the cavity, and a point on the piston head corresponding to a position of the second spark plug being provided outside the first and second sections.

7. The combustion chamber of claim 2 wherein the first spark plug is mounted in the cylinder head such that the firing tip of the same exits into the combustion chamber closer to a tip of the fuel injector.

8. The combustion chamber of claim 7 further comprising a raised platform in which the cavity is formed provided on the piston head, the platform being oval-shaped with a majority of the same being positioned to a side of the line opposite to a position on the piston head corresponding to the first spark plug and the platform slanting downward toward the piston head on both sides of the line.

9. The combustion chamber of claim 8 wherein positions corresponding to the first and second spark plugs lie inside the cavity.

10. The combustion chamber of claim 2 further comprising a raised platform in which the cavity is formed provided on the piston head, the platform being substantially rectangular when viewed from above and dome-shaped in relation to a surface of the piston head, the cavity including a wide portion formed in a middle of the platform and a narrow portion extending to an end of the second section of the platform to a surface of the piston head.

11. The combustion chamber of claim 2 further comprising a raised, dome-shaped platform in which the cavity is formed provided on the piston head, edges of the platform at opposite ends of lengths of the same extending to almost a circumference of the piston head and following an arcuate shape of the same, while edges along a width of the platform being substantially straight and ending at a predetermined distance from the circumference of the piston head.

12. The combustion chamber of claim 11 wherein a line formed along a width of the platform divides the same in half to form a first section and a second section, the first and second sections slanting downward from the line toward the surface of the piston head, and the cavity extending into both the first and second sections and including a first portion and a second portion divided along the line.

* * * * *